July 7, 1936.                R. J. OERTEL                2,046,774
              UNIVERSAL CLUTCH CENTRALIZING TOOL
                       Filed Oct. 3, 1932
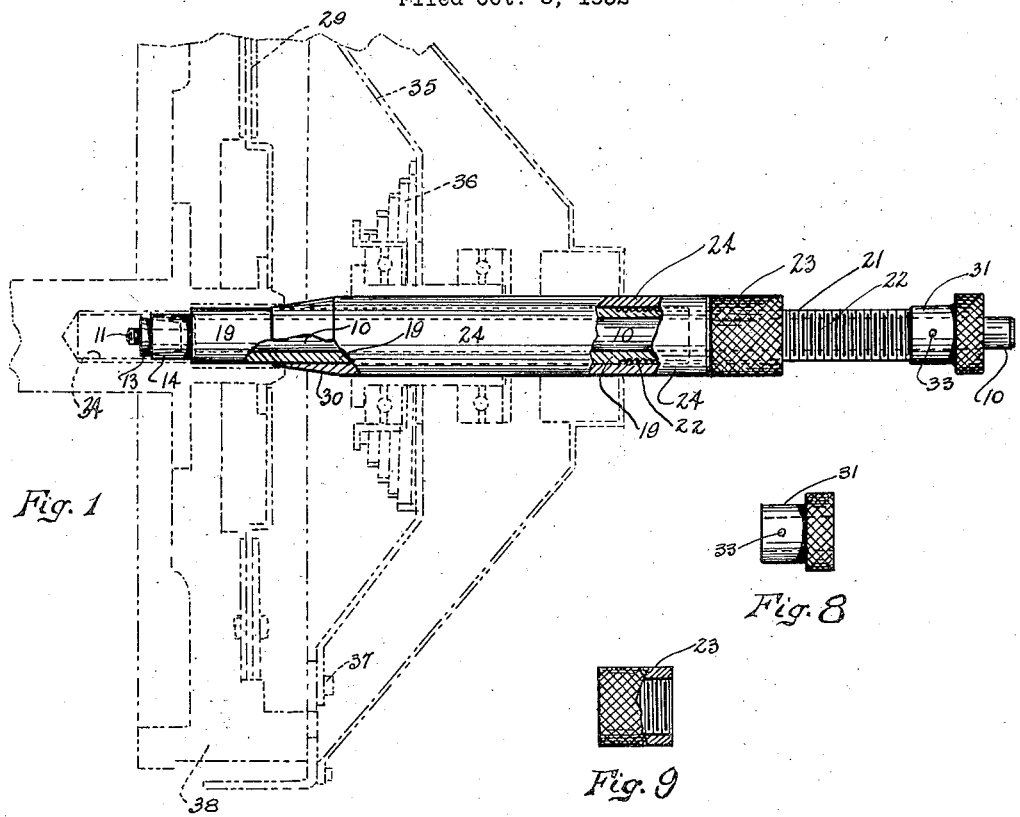
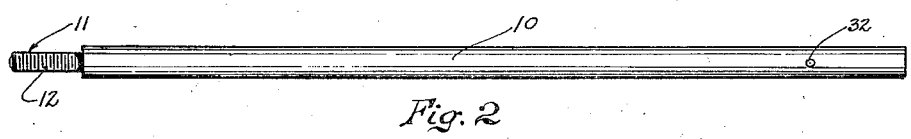
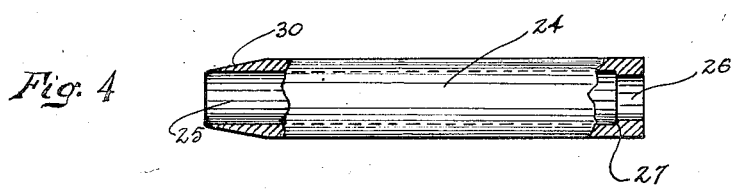
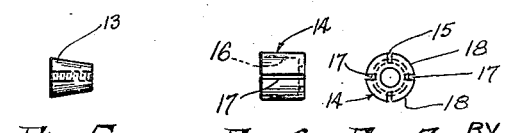
INVENTOR
Richard J. Oertel
BY
ATTORNEY Patented July 7, 1936

2,046,774

UNITED STATES PATENT OFFICE 2,046,774

UNIVERSAL CLUTCH CENTRALIZING TOOL

Richard J. Oertel, Streator, Ill.

Application October 3, 1932, Serial No. 636,007

8 Claims. (Cl. 29—89)

This invention relates to aligning tools and more particularly to clutch centralizing devices, although certain features thereof may be employed with equal advantage for other purposes.

It contemplates more especially the provision of a novel device which is universally adapted for detachable mounting in a bearing in order to align cooperating parts relative thereto.

It is extremely difficult to assemble cooperating parts that require true alignment, especially in automobiles and other situations where there is limited accessibility from an inconvenient position. More particularly, it has always been a problem to properly assemble the parts of a vehicle clutch, since the cooperating parts thereof require absolute alignment for proper functioning. The friction disc of a clutch must be aligned relative to the crank shaft of a vehicle for cooperation with a presser plate. The alignment of these cooperating parts proves difficult and entails a great deal of labor and expense under ordinary circumstances and with tools of known construction.

One object of the present invention is to simplify the construction and improve the operation of the devices of the character mentioned.

Another object is to provide a device which is adapted to align cooperating parts preparatory to the assembly thereof.

Still another object is to provide a bearing mounted tool for alignment of the cooperating parts assembled in connection therewith.

A further object is to provide a tool that is readily attachable and detachable for support by a bearing to align cooperating parts relative thereto.

A still further object is to provide an aligning tool having interchangeable collets for ready attachment and detachment to a bearing for support and parts alignment.

Still a further object is to provide an aligning tool provided with collets for expansion and contraction to effect the engagement of a bearing for support thereof in aligning cooperating parts relative thereto.

Other objects and advantages will appear from the following description of an illustrative embodiment of the present invention.

In the drawing:

Figure 1 is a front view in elevation of a device embodying features of the present invention, parts thereof being broken away to clarify the showing with a clutch assembly in dotted outline to illustrate the application thereof.

Figure 2 is a front view in elevation of a rod constituting the axial constituent of the tool disclosed in Figure 1.

Figure 3 is a front view in elevation of a tubular body member adapted to receive the rod disclosed in Figure 2, parts thereof being broken away to clarify the showing.

Figure 4 is a front view in elevation of a sleeve adapted to slide over the body member disclosed in Figure 3, parts thereof being broken away to clarify the showing.

Figure 5 is a front view in elevation of a circular wedge or frusto-conical member which is in threaded engagement with the extremity of the rod disclosed in Figure 2 for registry with the cavity of the collet disclosed in Figure 6.

Figure 6 is a front view in elevation of a collet adapted for mounting on the threaded extremity of the rod disclosed in Figure 2.

Figure 7 is a front view of the collet shown in Figure 6.

Figure 8 is a front view in elevation of the knob adapted for attachment to the rod disclosed in Figure 2.

Figure 9 is a front view in elevation of a knurled nut intended for threaded engagement with the shank of the tubular body disclosed in Figure 3.

The structure selected for illustration comprises an elongated rod 10 which has a reduced extremity 11 provided with threads 12 for the adjustable reception of a frusto-conical wedge member 13 thereon. A collet 14 is provided with an axial bore 15 somewhat larger in diameter than the threaded rod extension 11 for the reception thereof. As shown, the collet 14 is provided with a cylindrical cavity 16 for cooperation with the frusto-conical wedge member 13 to effect the expansion and allow the contraction thereof as afforded by the longitudinal slots 17 provided in the surface thereof. The slots 17 are circumferentially spaced at uniform intervals to provide a plurality of expansible intervening surfaces 18, in this instance four, which cylindrically confront each other to define the cavity 16 for the reception of the wedge 13 serving as the expanding means.

Prior to the assembly of the collet 14 to the wedge 13 in threaded engagement with the rod extension 11, an elongated body member 19 having an axial bore 20 is telescoped over the rod 10 which is sufficiently small in diameter for the reception thereof. The body member 19 is of tubular cylindrical configuration, and terminates in a reduced shank portion 21 which is provided with a plurality of threads 22 for the cooperative engagement of a knurled nut 23 adapted to retain a sleeve 24 in position thereon. The sleeve 24 is provided with an axial bore 25 somewhat larger in diameter than the exterior of the body 19 to slide thereover from the extremity of the threaded shank 21. In order to limit the displacement of the sleeve 24 over the body member 19, the bore 25 terminates in a reduced bore 26 serving to define a shoulder 27 to cooperate with the shoulder 28 defined by the juncture of the body 19 with its reduced threaded shank portion 21. It is to be noted that the reduced bore 26 of the sleeve 24, is sufficiently large to receive the threaded shank 21 of the body member 19, thereby enabling the sleeve 24 to pass thereover in that it is of sufficient length to project therebeyond as the shoulder 27 approaches or contacts with the shoulder 28.

In order to facilitate the registry of the sleeve 24 with the axial bore of a member such as a clutch plate 29, the projecting extremity thereof is tapered as at 30 to constitute a centralizing medium for a plate or other part having a bore or central bearing of a diameter between the range of the conical surface 30. The nut 23 may be utilized, therefore, to displace the sleeve 24 and/or to retain the adjusted position thereof during the application of a clutch plate 29 or any other part in position as will appear more fully hereinafter.

A knob 31 is detachably associated with the extremity of the axial rod 10 which has an aperture 32 provided therethrough proximate to the free extremity thereof. The knob 31 has a correspondingly sized aperture 33 provided therethrough to receive a pin so as to effect attachment against relative rotary and longitudinal movement with the rod 10. Rotation of the rod 10 through the medium of the knurled knob 31 effects the traverse of the wedge 13 relative to the collet 14, thereby expanding or allowing the contraction of the latter depending upon the direction of displacement toward or from the collet 14, respectively. Initially, a collet 14 of a size somewhat smaller than the bore of a bearing 34, is placed over the threaded extremity 11 of the rod 10, and thereupon a wedge 13 is threadedly engaged therewith. Rotation of the rod 10 is then effected through the knob 31 so as to expand the collet 14 to engage the bore 34 for effecting the support of the rod 10 together with its associated elements 19 and 24. This is accomplished with the clutch plate 29 or other part already telescoped upon the body member 19, and displacement thereof is effected by means of the sleeve 24 which is either accomplished by movement directly by the attendant's hand or through the rotation of the knurled nut 23. In any event when the sleeve 24 is displaced to its extreme position toward the bearing 34 to place the plate 29 or other part in its assembled position, the nut 23 is adapted by rotary movement to engage or contact the extremity of the sleeve 24 so as to maintain the displaced extreme position thereof conducive to the assembly of the part in question such as the disc 29 to effect the centralization thereof relative to the bearing 34. In this position, the tapered region 30 of the sleeve 24 engages the part to be assembled, in this instance the clutch element 29, thereby precluding lateral or axial displacement thereof out of alignment with the bearing 34.

In the case of centralizing clutch parts for assembly, the presser plate 35 is telescoped over the sleeve 24 for displacement in direct contact with the clutch plate 29 with its springs 36 in association therewith. This permits the presser plate 35 to be bolted or otherwise fastened as at 37 to the fly wheel 38 of an engine. Obviously, the cooperating parts are thus assembled, and aligned relative to the bearing 34 which serves as a support for the centralizing tool described supra. Any size of collets 14 may be substituted depending upon the dimensional extent of the bearing 34 in any particular installation.

Various changes may be made in the embodiment of the invention herein specifically described without departing from or sacrificing any of the advantages of the invention as defined in the appended claims.

I claim:

1. In a device of the character described, the combination with an elongated member, of a sleeve on said elongated member for aligning cooperating parts, an adjusting nut in threaded engagement with said elongated member to abut against said sleeve, a bearing engaging collet axially associated with said member, and means for expanding said collet to detachably engage a bearing for supporting said elongated member in aligning parts axially thereof.

2. In a device of the character described, the combination with an elongated member, of a sleeve on said elongated member for aligning cooperating parts, an adjusting nut in threaded engagement with said elongated member to abut against said sleeve, a bearing engaging collet axially associated with said member, an adjusting rod extending axially through said elongated member for receiving said collet thereon, and means on said rod for expanding said collet to detachably engage a bearing for aligning parts axially thereof.

3. In a device of the character described, the combination with an elongated member, of a sleeve on said elongated member for aligning cooperating parts, an adjusting nut in threaded engagement with said elongated member to abut against said sleeve, a bearing engaging collet axially associated with said member, an adjusting rod extending axially through said elongated member for receiving said collet thereon, and wedge means on said rod for expanding said collet to detachably engage a bearing for aligning parts axially thereof.

4. In a device of the character described, the combination with an elongated member, of a sleeve on said elongated member for aligning cooperating parts, an adjusting nut in threaded engagement with said elongated member to abut against said sleeve, a bearing engaging collet axially associated with said member, an adjusting rod extending axially through said elongated member for receiving said collet thereon, and wedge means threaded on said rod for expanding said collet to detachably engage a bearing for aligning parts axially thereof.

5. In a device of the character described, the combination with an elongated member, of an exteriorly tapered sleeve on said elongated member for aligning cooperating parts, an adjusting nut in threaded engagement with said elongated member to abut against said sleeve, a bearing engaging collet axially associated with said member, an adjusting rod extending axially through said elongated member for receiving said collet thereon, and wedge means threaded on said rod for expanding said collet to detachably engage a bearing for aligning parts axially thereof.

6. In a device of the character described, the combination with an elongated member, of a rod mounted axially within said member for relative rotation therewith, an expansible collet detachably associated with said rod adjacent an extremity of said member, a sleeve reciprocable on said member for displacing parts to be aligned longitudinally thereof, a nut in threaded engagement with said member to displace and lock said sleeve in selected position, and a wedge in threaded cooperation with said rod for expanding said collet responsive to the rotation thereof relative to said member for mounted bearing support.

7. In a device of the character described, the combination with an elongated member, of a rod mounted axially within said member for relative rotation therewith, an expansible collet detachably associated with said rod adjacent an extremity of said member, an exteriorly tapered sleeve reciprocable on said member for displacing parts to be aligned longitudinally thereof, a nut in threaded engagement with said member to displace and lock said sleeve in selected position, and a wedge in threaded cooperation with said rod for expanding said collet responsive to the rotation thereof relative to said member for mounted bearing support.

8. In a clutch testing and adjusting tool of the character set forth, for servicing clutches of the type having a pilot bearing and a friction disk, the combination with an elongated central shaft, of a tubular sleeve on said shaft, an expanding collet on said shaft adapted to fit the pilot bearing, means on the outer end of said shaft for expanding said collet, a bushing sleeved on said sleeve for coaction with the hub of the friction disk, and means on said sleeve acting to force said bushing into engagement with the hub of the friction disk.

RICHARD J. OERTEL.